(12) United States Patent
Tolia et al.

(10) Patent No.: US 8,355,828 B2
(45) Date of Patent: Jan. 15, 2013

(54) DETERMINING OPTIMAL SETTINGS FOR RESOURCE ACTUATORS

(75) Inventors: Niraj Tolia, Mountain View, CA (US); Zhikui Wang, Fremont, CA (US); Manish Marwah, Mountain View, CA (US); Cullen E. Bash, Los Gatos, CA (US); Parthasarathy Ranganathan, Fremont, CA (US); Xiaoyun Zhu, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 967 days.

(21) Appl. No.: 12/404,019

(22) Filed: Mar. 13, 2009

(65) Prior Publication Data

US 2010/0235011 A1  Sep. 16, 2010

(51) Int. Cl.
*G06F 1/28* (2006.01)
(52) U.S. Cl. ............ 700/296; 700/295; 700/29; 700/33; 700/30; 700/45; 703/2; 713/320; 318/634; 714/5.11

(58) Field of Classification Search .................. 700/295, 700/29, 33, 30, 45, 296; 703/2; 713/320; 318/634; 714/5.11
See application file for complete search history.

(56) References Cited

U.S. PATENT DOCUMENTS

| 7,583,043 | B2 * | 9/2009 | Chung et al. | 318/634 |
| 2008/0313492 | A1 * | 12/2008 | Hansen | 714/5 |
| 2012/0005505 | A1 * | 1/2012 | Tolia et al. | 713/320 |

* cited by examiner

*Primary Examiner* — Tejal Gami (57) ABSTRACT

A power model that relates the settings of resource actuators to power consumption levels of the resource actuators and a condition model that relates the settings of the resource actuators to an environmental condition at the location of the at least one entity and a power consumption level of the at least one entity are developed. A constraint optimization problem having an objective function and at least one constraint is formulated, where the objective function computes at least a proportional quantity of a total power consumption level of the resource actuators and the at least one constraint comprises a setpoint environmental condition at a location of the at least entity. A solution to the constraint optimization problem is determined, where the solution provides optimal values for the resource actuator settings.

20 Claims, 4 Drawing Sheets

DETERMINING OPTIMAL SETTINGS FOR RESOURCE ACTUATORS

CROSS-REFERENCE TO RELATED DISCLOSURE

The present application shares some common subject matter with PCT Application Serial No. PCT/US2009/037177, filed on Mar. 13, 2009, the disclosure of which is hereby incorporated by reference in its entirety.

BACKGROUND

Power is a critical issue in the design and operation of enterprise servers and data centers and is expected to continue to increase in importance due to the ever increasing demands of servers and data centers. Power consumed by cooling equipment (for instance, fans and computer room air conditioners) has also become a significant component in the design and operation of the enterprise servers and data centers. By way of example, the yearly electricity costs for the cooling equipment alone in a large data center (for instance, 30,000 square feet, rated at 10 MW) has been known to run in the millions of dollars.

The same trends in increased power consumption levels are also becoming more applicable at smaller scales, for instance, at the cluster level, or even at an individual server level. More particularly, with increasingly dense compute infrastructures and more powerful processors, the server fans are known to consume increasingly large amounts of power. For instance, the peak power usage by fans and certain blade servers has been found to be as high as 2000 W, which comprises about 23% of the typical system power of the blade server.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a system and method for determining optimal settings for resource actuators that vary the supply of resources, such as, cooling airflow, or other fluid to one or more entities. The optimal settings for the resource actuators are determined through the construction of models that relate power consumption to resource actuator settings and models that relate condition setpoint requirements to the resource actuator settings. The models are used to formulate an optimization problem, in which the power consumption levels of the resource actuators are the objective function and the condition setpoint requirements of the entities are the constraints to the optimization problem. In addition, the solution to the optimization problem provides the optimal values for the resource actuator settings based upon real time information on the entities and the resource actuators.

The settings for the resource actuators are considered to be optimized when the resource actuators are able to be operated at minimized power consumption levels while satisfying one or more condition setpoint requirements at the one or more entities. By way of particular example, the resource actuators comprise fans and the entities comprise blade servers positioned downstream of the fans. In this example, the system and method disclosed herein determine the minimal speeds (optimal settings) at which the fans may be operated while supplying sufficient (condition setpoint requirement) levels of cooling to the blade servers.

Through implementation of the system and method disclosed herein, the amount of power consumed by the resource actuators in providing resources, such as, cooling resources, to the entities is minimized. This minimized power consumption translates into savings in both operating cost and, in certain instances, $CO_2$ emissions, while minimizing the impact on the operations of the entities. In addition, because the optimal resource actuator settings are determined through a model-based approach based on physics, the models may evolve with the system, thereby resulting in a robust control system.

Figure 1A:
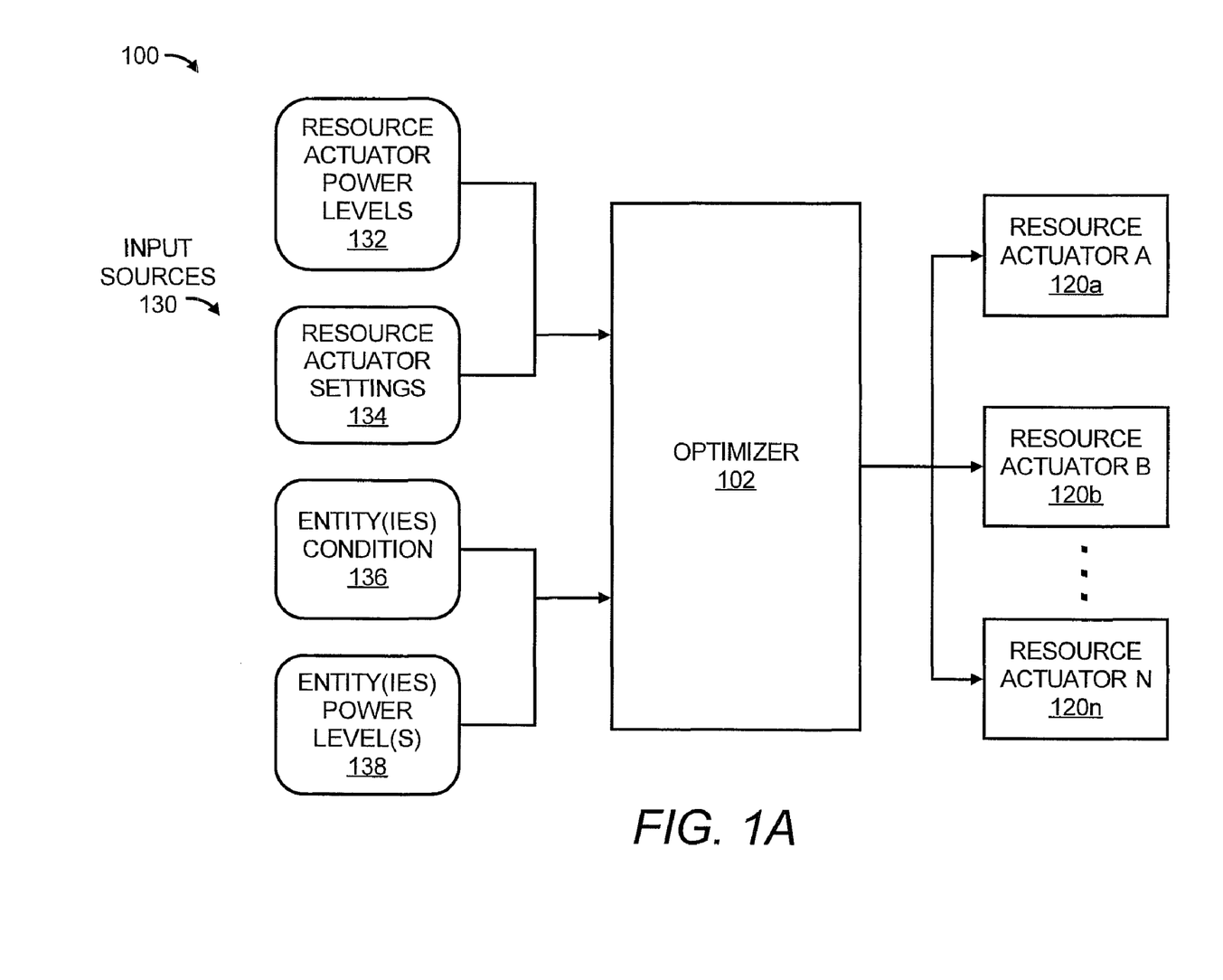
FIG. 1A shows a simplified block diagram of a system for determining optimal settings for a plurality of resource actuators, according to an embodiment of the invention.

With reference first to FIG. 1A, there is shown a simplified schematic diagram of a system 100 for determining optimal settings for a plurality of resource actuators 120a-120n, according to an example. It should be understood that the system 100 may include additional elements and that some of the elements described herein may be removed and/or modified without departing from the scope of the system 100.

As shown, the system 100 includes an optimizer 102, which may comprise software, firmware, and/or hardware and is configured to determine optimal settings for a plurality of resource actuators 120a-120n. According to an example, the plurality of resource actuators 120a-120n are configured to affect one or more conditions at one or more entities. Thus, the plurality of resource actuators 120a-120n may be considered as providing shared resources, such as, cooling or other environmental condition resources, to the one or more entities, which may comprise any heat generating device, such as, electronic chips, servers, power supplies, networking equipment, storage devices, etc. The optimal settings for the resource actuators 120a-120n may be defined as those settings for the resource actuators 120a-120n that minimizes the total power consumption of the resource actuators 120a-120n while satisfying one or more predetermined conditions at each entity.

Although the resource actuators 120a-120n and the entities may comprise any number of different combinations of elements, the following examples are provided to afford a clearer understanding of potential relationships between resource actuators 120a-120n and entities. As a first particular example, the resource actuators 120a-120n comprise fans and the entities comprise servers, in which the fans and servers are positioned in an enclosure. As another particular example, the resource actuators 120a-120n comprise air conditioning units and the entities comprise servers housed in racks, in which the air conditioning units and the servers are housed in a room, such as a data center. As a further particular example, the resource actuators 120a-120n comprise firing actuators positioned in nozzles of a fluid jetting device and the entity comprises an electronic chip. As a yet further particular example, the resource actuators 120a-120n comprise pumps and the entities comprise air conditioning units, in which the pumps are positioned along various pipes configured to supply a cooling fluid to the air conditioning units.

As also shown in FIG. 1A, the optimizer 102 receives data from various input sources 130, which are described in greater detail herein below with respect to FIG. 1B. The data includes resource actuator power levels 132, resource actuator settings 134, conditions of one or more entities 136, and power levels of the one or more entities 138. The optimizer 102 is generally configured to implement the data received from the input sources 130 in determining the optimal settings for the plurality of resource actuators 120a-120n through use of physics-based models. More particularly, the optimizer 102 is configured to determine the settings for the plurality of resources actuators 120a-120n that minimize the power consumed by the resource actuators 120a-120n while maintaining at least a predefined level of resource provisioning to one or more entities.

Figure 1B:
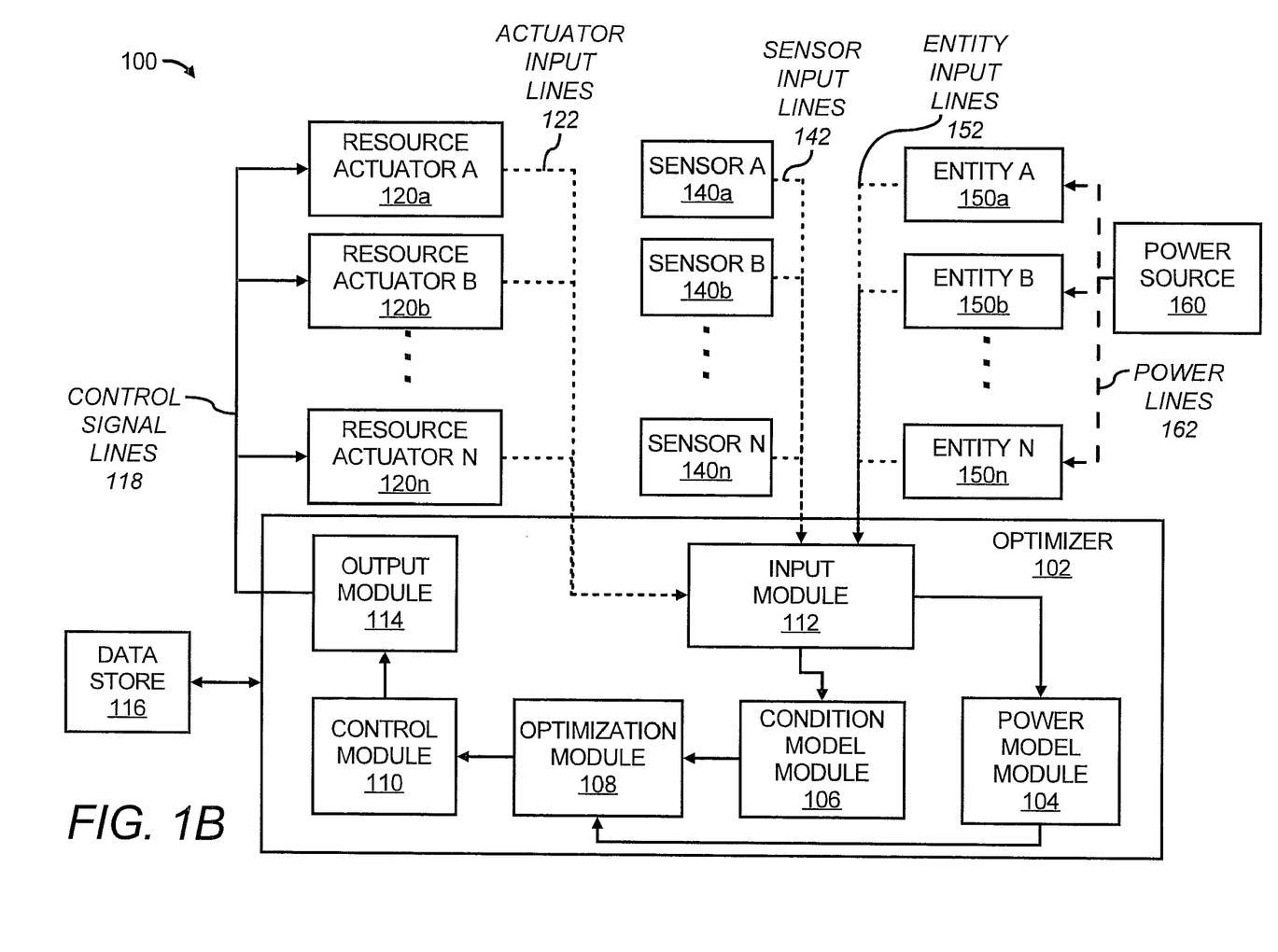
FIG. 1B shows a more detailed block diagram of the system depicted in FIG. 1A, according to an embodiment of the invention.

Turning now to FIG. 1B, there is shown a more detailed schematic diagram of the system 100, according to an example. As shown in FIG. 1B, the optimizer 102 is depicted as including a power model module 104, a condition model module 106, an optimization module 108, a control module 110, an input module 112, and an output module 114. The modules 104-114 are designed to perform various functions in the optimizer 102 using data obtained from the input sources 130.

In instances where the optimizer 102 comprises software, the optimizer 102 may be stored on a computer readable storage medium and may be executed or implemented by a computing device processor (not shown). In these instances, the modules 104-114 may comprise software modules or other programs or algorithms configured to perform the functions described herein below. In instances where the optimizer 102 comprises firmware and/or hardware, the optimizer 102 may comprise a circuit or other apparatus configured to perform the functions described herein below. In these instances, the modules 104-114 may comprise one or more of software modules and hardware modules configured to perform these functions.

In addition to the optimizer 102 and the resource actuators 120a-120n, the system 100 is depicted as including a plurality of sensors 140a-140n and a plurality of entities 150a-150n. The "n" denotes an integer value greater than or equal to one in each of the previously discussed reference numerals, and thus indicates that the system 100 may include one or more resource actuators 120a-120n, one or more sensors 140a-140n, and one or more entities 150a-150b.

Each of the resource actuators 120a-120n may generally be defined as any reasonably suitable device capable of varying the provisioning of a shared resource, such as, a cooling fluid, air, water, etc., to one or more of the entities 150a-150n. In addition, each of the resource actuators 120a-120n may have multiple settings, for instance, settings in addition to "on" and "off" to thus vary the supply of the fluid to multiple levels. Moreover, the resource actuators 120a-120n may comprise homogeneous or heterogeneous devices. As an example of heterogeneous devices, for instance, one of the resource actuators 120a may be configured to vary the supply of airflow whereas another one of the resource actuators 120b may be configured to vary the supply of a liquid coolant provided to one or more of the entities 150a-150n.

Likewise, each of the entities 150a-150n may be defined as any reasonably suitable device that is positioned to be affected by variations of the supply of the fluid by one or more of the resource actuators 120a-120n. In addition, the sensors 140a-140n are configured to sense one or more of the conditions, such as, temperature, fluid flow volume, fluid flow velocity, pressure, humidity, thermal resistance, etc., around the entities 150a-150n. The sensors 140a-140n may have a one-to-one correlation with the entities 150a-150n or there may be more or fewer sensors 140a-140n as compared with entities 150a-150n.

According to an example, each of the sensors 140a-140n may be associated with one or more of the entities 150a-150n and may thus be configured to detect one or more conditions of a resource supplied to respectively associated entities 150a-150n. Thus, for instance, a first sensor 140a is configured to detect a condition of a resource supplied to a first entity 150a, a second sensor 140b is configured to detect a condition of a resource supplied to a second entity 150b, etc. According to an example, the first sensor 140a may be positioned at a fluid inlet of a first entity 150a, the second sensor 140b may be positioned at a fluid inlet of a second entity 150b, etc. In another example, the first sensor 140a may be positioned within a first entity 150a, the second sensor 140b may be positioned within a second entity 150b, etc.

As further shown in FIG. 1B, the entities 150a-150n receive power from a power source 160 through respective power lines 162. Although not shown, the optimizer 102, the resource actuators 120a-120n, and the sensors 140a-140n also receive power from a power source, which may be the same or different from the power source 160. In any regard, the amount of power that the entities 150a-150n draw from the power source 160 may be tracked through any suitable known manner. For instance, each of the entities 150a-150n may be equipped with a power meter configured to measure the amount of power that each of the entities 150a-150n consumes. As another example, power meters may be positioned along the power lines 162, externally to the entities 150a-150n, to measure the power supplied into the entities 150a-150n. As a further example, the amount of power consumed by the entities 150a-150n may be calculated, for instance, based upon the levels at which the entities 150a-150n are operating. By way of particular example in which the entities 150a-150n comprise servers, the operating levels of the processors may be used to calculate the power consumption levels of the servers.

The input module 112 is configured to receive input from input sources 130, which, in one example, include, the resource actuators 120a-120n, sensors 140a-140n, and entities 150a-150n. The input module 112, more particularly, is configured to receive settings of the resource actuator 120a-120n via actuator input lines 122, conditions sensed by the sensors 140a-140n via sensor input lines 142, and the entity power levels 138 via entity input lines 152. The input module 112 may also be configured to receive resource actuator 120a-120n power consumption levels via the actuator input lines 122.

In other examples, the input module 112 is configured to receive input from devices configured to track one or more operating conditions of the resource actuators 120a-120n and/or the entities 150a-150n. These devices may include, for instance, devices positioned internally or externally to the resource actuators 120a-120n configured to track the settings of the resource actuators 120a-120n. By way of example, the devices may comprise encoders that detect the position of various components, such as, louvers, pump components, fan components, etc., configured to vary the flow of fluid through the resource actuators 120a-120n. As another example, these devices may comprise sensors positioned to detect a characteristic, such as, velocity, pressure, volume flow rate, etc., of fluid flow supplied through the resource actuators 120a-120n, which may be used to determine the resource actuator 120a-120n settings.

These devices may also include, for instance, devices positioned internally or externally to the entities 150a-150n, such as power meters, configured to measure the power consumption levels of the entities 150a-150n.

The data received through the input module 112 may be stored in a data store 116, which the optimizer 102 may access in performing various functions discussed below. The data store 116 may comprise volatile and/or non-volatile memory, such as DRAM, EEPROM, MRAM, flash memory, and the like. In addition, or alternatively, the data store 116 may comprise a device configured to read from and write to a removable media, such as, a floppy disk, a CD-ROM, a DVD-ROM, or other optical or magnetic media.

The power model module 104 is configured to develop a power model that relates the settings of the resource actuators 120a-120n to power consumption levels of the resource actuators 120a-120n. The power model module 104 is configured to develop the power model through application of a suitable algebraic form of the relationship between the power consumed by a resource actuator 120a-120n and its setting. An example of a suitable form is:

$$P_i = f_i(A_i). \qquad \text{Equation (1)}$$

In Equation (1), $P_i$ is the power consumed by the ith resource actuator 120a-120n, $A_i$ is the setting of the ith resource actuator 120a-120n, and $f_i$ is an algebraic function relation $P_i$ to $A_i$. In addition, the total power consumption (P) of the plurality of resource actuators 120a-120n is defined as the sum of the power consumption levels of the resource actuators 120a-120n, or:

$$P = \Sigma P_i. \qquad \text{Equation (2)}$$

According to an example, the settings of the resource actuators 120a-120n may be expressed as vectors. In addition, the function $f_i$ may be determined by collecting experimental data pertaining to the resource actuator 120a-120n settings and their power consumption levels and by fitting the function $f_i$ to the experimental data.

The condition model module 106 is configured to develop a condition model that relates the settings of the plurality of resource actuators 120a-120n to an environmental condition at the location of at least one entity 150a-150n and a power consumption level of the at least one entity 150a-150n. The condition module 106 is configured to develop the condition model through application of a suitable algebraic form of the relationship between a plurality of the resource actuator 120a-120n settings, the detected environmental condition, the power consumed by the at least one entity 150a-150n, material properties of the at least one entity 150a-150n, such as, thermal resistance, etc. Although the form of the relationship may take many forms depending upon any number of various factors, an example of a suitable form is:

$$EC_i = g_i(A_1, \ldots, A_n, PE_i). \qquad \text{Equation (3)}$$

In Equation (3), $EC_i$ is the condition at the ith entity 150a-150n, $A_j$ is the setting of the jth resource actuator 120a-120n, $PE_i$ is the power consumed by the ith entity 150a-150n, and $g_i$ is an algebraic function relating the condition to the resource actuator settings and the power consumption level of the ith entity 150a-150n. In addition, the function $g_i$ may be determined by collecting experimental data pertaining to the resource actuator 120a-120n settings, the power consumption levels of the entities 150a-150n, and the detected conditions and by fitting the function $g_i$ to the data. It should be noted that when the entities 150a-150n comprise heterogeneous entities, such as, blade servers, network switches, storage arrays, etc., the function $g_i$ will depend upon the specific entity.

The optimization module 108 is configured to formulate a constraint optimization problem having an objective function and a plurality of constraints using the power model developed by the power model module 104 and the condition model developed by the condition model module 106. The objective function computes at least a proportional quantity of a total power consumption level of the plurality of resource actuators 120a-120n and the at least one constraint comprises a setpoint environmental condition at a location of at least one entity 150a-150n. In order to construct the objective function, a relationship between a resource actuator 120a-120n setting and the power consumed by that resource actuator 120a-120n is necessary. The optimization module 108 is configured to employ the power model, which captures this relationship based upon physics, to construct the objective function.

The at least one constraint, more particularly, captures a condition setpoint requirement, such as, temperature, pressure, humidity, etc., at each entity requiring a setpoint environmental condition. The setpoint environmental condition may be specified in terms of threshold conditions at one or more locations within or outside of of an entity 150a-150n. In addition, the optimization module 108 employs the condition model to quantify the setpoint condition requirement.

The optimization module 108 is further configured to employ one or more mathematical tools to solve the constraint optimization problem, the solution of which provides optimal settings for the plurality of resource actuators 120a-120n. These mathematical tools include, for instance, Lagrangian multipliers, dynamic programming, interior point methods, etc. The selection of which of the mathematical tools to employ may be based upon the nature of the objective function, for instance, whether it is linear, quadratic, cubic, etc. and the nature of the at least one constraint, for instance, whether it is linear or non-linear.

According to an example, the optimization module 108 stores the solution to the constraint optimization problem or the optimal settings for the plurality of resource actuators 120a-120n in the data store 116. According to another example, the optimization module 108 employs the output module 114 to output the solution or the optimal settings to a computing device, a display screen, to a controller of the resource actuators 120a-120n, etc.

The optimizer 102 optionally includes a control module 110 configured to generate command signals for the resource actuators 120a-120n. In this example, the control module 110 is configured to generate command signals for each of the resource actuators 120a-120n to be set to the optimal settings determined by the optimization module 108. In addition, the control module 110 is configured to communicate the command signals to the resource actuators 120a-120n through the output module 114 over control signal lines 118. The control module 110 is considered to be optional because the functions of the control module 110 may be performed by a separate controller of the resource actuators 120a-120n using the optimized settings determined by the optimizer 102.

Figure 2:
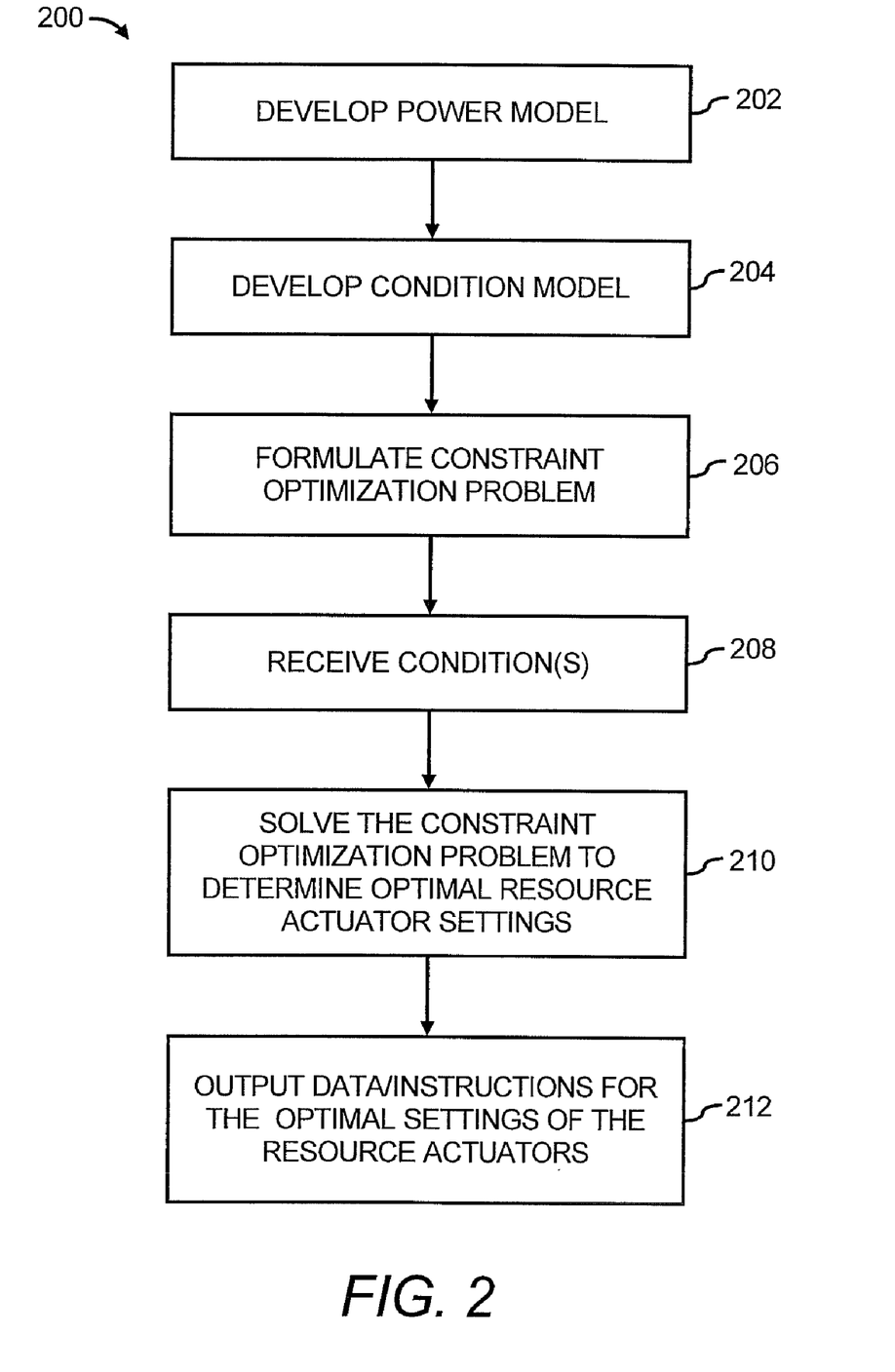
FIG. 2 illustrates a flow diagram of a method of determining optimal settings for a plurality of resource actuators, according to an embodiment of the invention.

An example of a method in which the optimizer 102 may be employed to determine optimal settings for a plurality of resource actuators 120a-120n will now be described with respect to the following flow diagram of the method 200 depicted in FIG. 2, according to an example. It should be apparent to those of ordinary skill in the art that the method 200 represents a generalized illustration and that other steps may be added or existing steps may be removed, modified or rearranged without departing from a scope of the method 200.

The description of the method 200 is made with reference to the systems 100 illustrated in FIGS. 1A and 1B, and thus makes reference to the elements cited therein. It should, however, be understood that the method 200 is not limited to the elements set forth in the systems 100. Instead, it should be understood that the method 200 may be practiced by a system having a different configuration than that set forth in the systems 100.

A controller, such as a processor (not shown), may implement or execute the optimizer 102 to perform one or more of the steps described in the method 200 in determining the optimal settings for the plurality of resource actuators 120a-120n. As discussed above, the settings for the plurality of resource actuators 120a-120n are considered to be optimized when the total power consumption associated with operating the resource actuators 120a-120n is minimized while one or more predetermined conditions at each entity 150a-150n are satisfied.

At step 202, a first model (power model) that relates first dependent variables (the settings of the plurality of resource actuators 120a-120n) to second dependent variables (power consumption levels of the plurality of resource actuators 120a-120n) is developed. According to an example, and as discussed above, the power model module 104 may develop the power model through application of algebraic relationships on experimental data.

At step 204, a second model (condition model) that relates the first dependent variables (settings of the plurality of resource actuators 120a-120n) to second dependent variables (environmental condition at the location of at least one entity 150a-150n and a power consumption level of the at least one entity 150a-150n) is developed. According to an example, and as also discussed above, the condition model module 106 may develop the condition model through application of algebraic relationships on experimental data.

At step 206, the optimization module 108 formulates a constraint optimization problem having an objective function and at least one constraint using the first model (power model) and the second (condition model). The objective function computes at least a proportional quantity of a total power consumption level of the plurality of resource actuators and the at least one constraint comprises a setpoint environmental condition at a location of the at least entity 150a-150n.

At step 208, the optimizer 102 receives substantially real time conditions. The conditions may include, for instance, the conditions detected by the sensors 140a-140n, the power levels of the entities 150a-150n, etc. In addition, the conditions are considered to be received in substantially real time to thus capture relatively current conditions.

At step 210, the optimization module 108 solves the constraint optimization problem based upon the substantially real time conditions received at step 208, in which the solution provides optimal values for the resource actuator 120a-120n settings. In addition, at step 212, the optimization module 108 outputs data/instructions pertaining to the optimal values for the resource actuator 120a-120n settings. The data pertaining to the optimal values may be outputted to the data store 116, displayed on a display device, printed by a printing device, communicated to a networked computing device or storage location, etc. The instructions pertaining to the optimal values may be communicated to the resource actuators 120a-120n to cause the resource actuators 120a-120n to operate at the optimal settings or to a controller of the resource actuators 120a-120n.

A particular example of an application of the method 200 will now be provided. In this example, the optimizer 102 is embodied in a fan controller, the entities 150a-150n comprise sixteen blade servers contained in an enclosure, and the resource actuators 120a-120n comprise ten fans. The environmental condition at the locations of the blade servers is temperature. As such, in this example, there are sixteen linear constraints, one for each blade server, that relate speeds of the ten fans to CPU temperature in a blade server.

The power consumption level of a fan (fan power) is a cubic function of the rotational speed of the rotor given in revolutions per minute (RPM). This relationship may be determined by manually setting the fan speed (FS) and then recording the power consumption level of the individual fan. According to an example, the fan power (P) of an individual fan (i) is approximated using a $3^{rd}$ order polynomial, as shown in the following equation:

$$P_{F,i} = a_0 * FS_i^3 + a_1 * FS_i^2 + a_2 * FS_i.$$ Equation (4):

In Equation (4), the parameters a0, a1, and a2 may be determined by fitting the parameters into experimental data. The power model may be developed (step 202) through use of Equation (4).

The condition model, which in this example comprises a temperature model, is developed based upon transient heat transfer theory, in which the rate of change of temperature of a device, such as, a CPU of a blade server, is related to the rate at which heat is generated within the device and the rate at which heat may be transferred from the device to a cooling medium, such as, air. More particularly, by conducting an energy balance among these three elements (rate of change of temperature, heat generation, and heat transfer), a differential equation that governs this dynamic relationship may be formed. In addition, this equation may be discretized and solved for CPU temperature as a function of heat generation ($T_{CPU_j}^P$), thermal resistance (R), and ambient temperature ($T_{amb}$). An example of this temperature model (T) of the jth CPU is shown in the following equation:

$$T_{CPU_j}^{P+1} = T_{CPU_j}^P + \frac{\Delta t}{C_{1,j}} \left( P_{CPU_j} + C_{2,j} \frac{T_{amb_j}^P - T_{CPU_j}^P}{R_j} \right).$$ Equation (5):

In Equation (5), P is the time step index, $\Delta t$ is the time step, $C_1$ and $C_2$ are constants related to the fluid properties of air and CPU package geometry and material properties, and R is the thermal resistance of a blade server. In addition, Equation (5) describes the time rate of change of CPU temperature to processor power dissipation, which is the first portion of the second term on the right hand side of Equation (5), while accounting for the thermal efficiency of the system, which is the last portion of the second term on the right hand side of Equation (5). The condition model depicted in Equation (5) may thus be used to predict the dynamic CPU temperature as a function of time, utilization, fan speed and ambient temperature. The condition model may be developed (step 204) through use of Equation (5).

The thermal resistance R of the blade server j may be calculated through the following equation:

$$R_j = k\dot{V}_j + C_R.$$ Equation (6):

In Equation (6), $\dot{V}_j$ is the volumetric rate of the air flow that goes through blade server j, k represents a weighting factor on the flow rate and is related to fluid and material properties, and geometry, and $C_R$ approximately represents the thermal resistance at zero flow rate. In addition, the volumetric rate of the air flow $\dot{V}_j$ may be determined through the following equation:

$$\dot{V}_j = \sum_i \eta_{i,j} * FS_i. \qquad \text{Equation (7):}$$

In Equation (7), the $\eta_{i,j}$ is an airflow correlation index that maps fan speed to the flow rate in blade server j, and $FS_i$ is the speed of fan i.

The constraints of the optimization problem (formulated at step 208) may comprise blade server temperature constraints, for instance, as represented in the following equation:

$$\sum_i k\eta_{ij} FS_i \le \frac{C_{2,j}(T^P_{CPU_j} - T^P_{amb_j})}{Q_j - \frac{C_{1,j}}{\Delta t}(T_{ref} - T^P_{CPU_j})} - C_R. \qquad \text{Equation (8):}$$

In addition, the objective function of the optimization problem may be given by the following equation:

$$\min \sum_i P_{F_i}. \qquad \text{Equation (9):}$$

In Equation (9), $P_{F_i}$ is the power consumption level of the fan i defined in Equation (4). In addition, a further constraint of the optimization problem may specify the upper bound (UB) and lower bound (LB) on the speeds of the fans (i), for instance, as given by the following equation:

$$LB_i \le FS_i \le UB_i. \qquad \text{Equation (10):}$$

Together, Equations (8), (9), and (10) describe an optimization problem with a cubic objective function and linear constraints. This is a convex optimization problem and the optimization module 108 may solve this problem using conventional mathematical tools, such as, interior points methods. In addition, the solution to this optimization problem provides the optimal settings for the fan speeds.

Some or all of the operations set forth in the method 200 may be contained as a utility, program, or subprogram, in any desired computer accessible medium. In addition, the method 200 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 3:
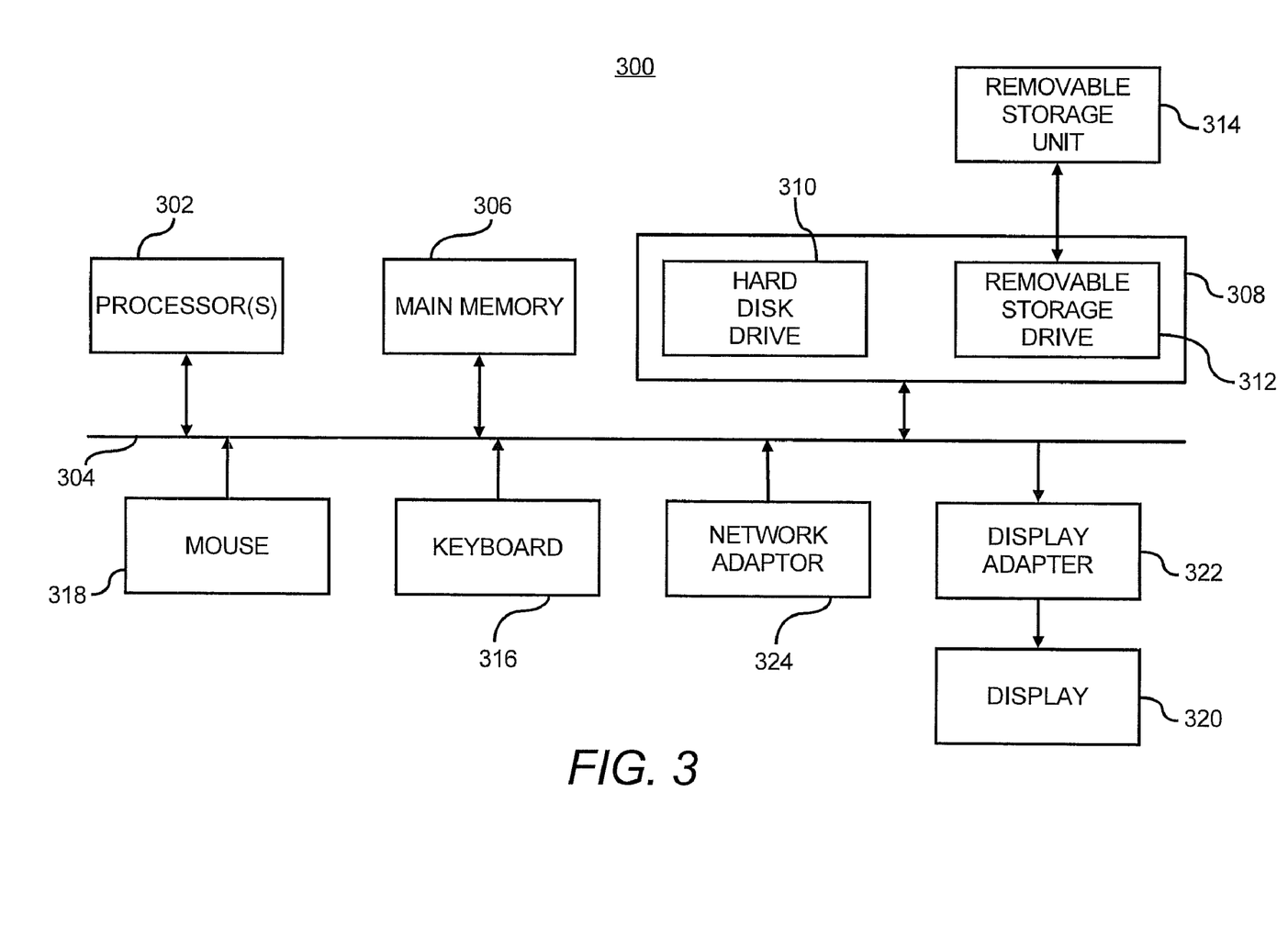
FIG. 3 shows a block diagram of a computing apparatus configured to implement or execute the optimizer depicted in FIGS. 1A and 1B, according to an embodiment of the invention.

FIG. 3 illustrates a block diagram of a computing apparatus 300 configured to implement or execute the optimizer 102 depicted in FIGS. 1A and 1B, according to an example. In this respect, the computing apparatus 300 may be used as a platform for executing one or more of the functions described hereinabove with respect to the optimizer 102.

The computing apparatus 300 includes a processor 302 that may implement or execute some or all of the steps described in the method 200. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for the method 200 may be stored.

The removable storage drive 310 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor(s) 302 may communicate over a network, for instance, the Internet, LAN, etc., through a network adaptor 324.

It will be apparent to one of ordinary skill in the art that other known electronic components may be added or substituted in the computing apparatus 300. It should also be apparent that one or more of the components depicted in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A non-transitory computer readable storage medium to determine minimized power consumption settings for a plurality of resource actuators configured to vary an environment condition at a location of at least one entity, comprising:
    computer-readable instructions stored on the non-transitory computer-readable medium executed by a computer to:
        develop a first model that relates first dependant variables with second dependent variables;
        develop a second model that relates the first dependant variables with third dependent variables;
        formulate a constraint optimization problem having an objective function and at least one constraint using the first model and the second model, wherein the objective function computes at least a proportional quantity of a total power consumption level of the plurality of resource actuators and wherein the at least one constraint comprises a setpoint environmental condition at a location of the at least entity; and
        solve the constraint optimization problem, wherein the solution provides minimized power consumption values for the plurality of resource actuator settings.

2. The non-transitory computer readable storage medium according to claim 1, wherein the first dependent variables comprises settings of the plurality of resource actuators, the second dependent variables comprising power consumption levels of the plurality of resource actuators, and the third dependent variables comprising an environmental condition at the location of the at least one entity and a power consumption level of the at least one entity;

wherein to develop the first model comprises to develop a power model that relates the settings of the plurality of resource actuators to power consumption levels of the plurality of resource actuators; and wherein to develop the second model comprises to develop a condition model that relates the settings of the plurality of resource actuators to the environmental condition at the location of the at least one entity and the power consumption level of the at least one entity.

3. The non-transitory computer readable storage medium according to claim 2, further comprising instructions executed by the computer to:

receive substantially real time conditions; and wherein to solve the constraint optimization problem further comprises to solve the constraint optimization problem based upon the received substantially real time conditions.

4. The non-transitory computer readable storage medium according to claim 2, wherein to develop the power model, develop the condition model and formulate the constraint optimization problem further comprises developing the power model, to develop the condition model and formulate the constraint optimization model offline and wherein solving the constraint optimization problem further comprises to solve the constraint optimization problem substantially in real time.

5. The non-transitory computer readable storage medium according to claim 2, wherein to formulate the constraint optimization problem comprises to formulate the constraint optimization problem such that the solution to the constraint optimization problem provides settings for the plurality of resource actuators that minimize power consumption of the plurality of resource actuators while satisfying the setpoint environmental condition at the location of the at least entity.

6. The non-transitory computer readable storage medium according to claim 2, wherein the power model is defined as:

$P_i = f_i(A_i)$, wherein $P_i$ is the power consumed by the ith resource actuator, $A_i$ is the setting of the ith resource actuator, and $f_i$ is an algebraic function relation $P_i$ to $A_i$, and wherein a total power consumption (P) of the plurality of resource actuators is defined as:

$$P = \Sigma P_i.$$

7. The non-transitory computer readable storage medium according to claim 6, further comprising instructions executed by the computer to:

obtain experimental data pertaining to a correlation of the settings of the plurality of resource actuators to power consumption levels of the plurality of resource actuators and fit the power model to the experimental data to calculate the function $f_i$.

8. The non-transitory computer readable storage medium according to claim 2, wherein the condition model is defined as:

$EC_i = g_i(A_1, \ldots, A_n, PE_i)$, wherein $EC_i$ is the condition at the ith entity, $A_j$ is the setting of the jth resource actuator, $PE_i$ is the power consumed by the ith entity, and $g_i$ is an algebraic function relating the condition to the resource actuator settings and the power consumption level of the ith entity.

9. The non-transitory computer readable storage medium according to claim 8, further comprising instructions executed by the computer to:

obtain experimental data pertaining to a correlation of the settings of the plurality of resource actuators to an environmental condition at the location of the at least one entity and fit the condition model to the experimental data to calculate the function $g_i$.

10. The non-transitory computer readable storage medium according to claim 2, wherein to solve the constraint optimization problem further comprises to employ at least one mathematical tool to solve the constraint optimization problem, wherein the at least one mathematical tool is selected based upon characteristics of the objective function and the constraints.

11. A computer-implemented optimizer including computer-readable instructions executed by a processor to determine minimized power consumption settings for a plurality of resource actuators configured to vary an environmental condition at the location of at least one entity, said computer-implemented optimizer comprising:

an input module including instructions executed by the processor to receive data from a plurality of input sources;

a power model module including instructions executed by the processor to develop a power model that relates the settings of the plurality of resource actuators to power consumption levels of the plurality of resource actuators;

a condition model module including instructions executed by the processor to develop a condition model that relates the settings of the plurality of resource actuators to an environmental condition at the location of the at least one entity and a power consumption level of the at least one entity; and an optimization module including instructions executed by the processor to formulate a constraint optimization problem having an objective function and at least one constraint using the power model and the condition model, wherein the objective function computes at least a proportional quantity of a total power consumption level of the plurality of resource actuators and wherein the at least one constraint comprises a setpoint environmental condition at a location of the at least entity, wherein the optimization module is further configured to solve the constraint optimization problem, wherein the solution provides minimized power consumption values for the plurality of resource actuator settings.

12. The computer-implemented optimizer according to claim 11, further comprising:

an output module including instructions executed by the processor to output the optimal values for the plurality of resource actuator settings.

13. The computer-implemented optimizer according to claim 11, wherein the optimization module further includes instructions executed by the processor to solve the constraint optimization problem substantially in real time with the data received from a plurality of input sources.

14. The computer-implemented optimizer according to claim 11, wherein the power model, the condition model, and the constraint optimization problem are configured to be one of developed and formulated offline.

15. The computer-implemented optimizer according to claim 11, further comprising:

a control module including instructions executed by the processor to generate command signals for each of the resource actuators to be set according to the determined minimized power consumption values, wherein the output module includes instructions executed by the processor to communicate the command signals to the resource actuators.

16. The computer-implemented optimizer according to claim 11, wherein the power model is defined as:

$P_i = f_i(A_i)$, wherein $P_i$ is the power consumed by the ith resource actuator, $A_i$ is the setting of the ith resource actuator, and $f_i$ is an algebraic function relation $P_i$ to $A_i$, and wherein a total power consumption (P) of the plurality of resource actuators is defined as:

$$P = \Sigma P_i.$$

17. The computer-implemented optimizer according to claim 11, wherein the condition model is defined as:

$EC_i = g_i(A_1, \ldots, A_n, PE_i)$, wherein $EC_i$ is the condition at the ith entity, $A_j$ is the setting of the jth resource actuator, $PE_i$ is the power consumed by the ith entity, and $g_i$ is an algebraic function relating the condition to the resource actuator settings and the power consumption level of the ith entity.

18. The computer-implemented optimizer according to claim 11, wherein the optimization model module includes instructions executed by the processor to solve the constraint optimization problem by employing at least one mathematical tool to solve the constraint optimization problem, wherein the at least one mathematical tool is selected based upon characteristics of the objective function and the constraints.

19. A computing apparatus comprising:
a processor and a memory storing code executed by the processor to:
develop a power model that relates the settings of the plurality of resource actuators to power consumption levels of the plurality of resource actuators through application of algebraic relationships on experimental data;
develop a condition model that relates the settings of the plurality of resource actuators to an environmental condition at the location of the at least one entity and a power consumption level of the at least one entity through application of algebraic relationships on experimental data;
formulate a constraint optimization problem having an objective function and at least one constraint using the power model and the condition model, wherein the objective function computes at least a proportional quantity of a total power consumption level of the plurality of resource actuators and wherein the at least one constraint comprises a setpoint environmental condition at a location of the at least entity;
receive one or more environmental and power level conditions; and
solve the constraint optimization problem based upon the received one or more environmental and power level conditions; and
determine minimized power consumption values for the plurality of resource actuator settings.

20. The computing apparatus according to claim 19, wherein the code stored in the memory for to solve the constraint optimization problem further comprises code to employ at least one mathematical tool to solve the constraint optimization problem, wherein the at least one mathematical tool is selected based upon characteristics of the objective function and the constraints.

* * * * *